(12) United States Patent
Stallings

(10) Patent No.: US 7,526,543 B2
(45) Date of Patent: Apr. 28, 2009

(54) METHOD OF SYNCHRONIZING EXECUTION OF STATE TRANSITION COMMANDS IN A CLUSTER OF MESSAGE ORIENTED MIDDLEWARE SERVERS

(75) Inventor: Jared D. Stallings, Denver, CO (US)

(73) Assignee: Raytheon Company, Waltham, MA (US)

( * ) Notice: Subject to any disclaimer, the term of this patent is extended or adjusted under 35 U.S.C. 154(b) by 293 days.

(21) Appl. No.: 11/491,875

(22) Filed: Jul. 24, 2006

(65) Prior Publication Data

US 2008/0022015 A1 Jan. 24, 2008

(51) Int. Cl.
*G06F 15/16* (2006.01)
*G06F 15/173* (2006.01)
(52) U.S. Cl. .................. 709/223; 709/201; 709/218; 709/224; 709/229

(58) Field of Classification Search .......... 709/201, 709/206, 223, 218, 224, 229
See application file for complete search history.

(56) References Cited

U.S. PATENT DOCUMENTS

2003/0009511 A1* 1/2003 Giotta et al. ............... 709/201
2005/0240654 A1* 10/2005 Wolber et al. ............. 709/206
2005/0240667 A1* 10/2005 Koegel ...................... 709/223

* cited by examiner

*Primary Examiner*—Quang N. Nguyen
(74) *Attorney, Agent, or Firm*—Glenn H. Lenzen

(57) ABSTRACT

A method of synchronizing execution of state transition commands in a cluster of MOM servers includes providing a lock transferable among the servers and a lock manager on each server. A server receiving a state transition command executes a state transition command handling process. A server receiving a request lock command from another server executes a received lock request process. A server receiving an engage lock command from another server executes an engage lock request process.

17 Claims, 11 Drawing Sheets ary via the server. For example, two
METHOD OF SYNCHRONIZING EXECUTION OF STATE TRANSITION COMMANDS IN A CLUSTER OF MESSAGE ORIENTED MIDDLEWARE SERVERS

BACKGROUND

Computer networks often have a client-server configuration, in which one or more clients are connected to a server via a communication medium, such as an Ethernet link. The server provides one or more services to the clients. For example, the server may provide messaging services or file storage services to computer workstation clients.

Clients in a client-server configuration often must send messages among each other via the server For example, two computerized instruments in a spacecraft may be connected to a server. The two computerized instruments, which are clients of the server, may exchange messages with each other via the server.

A messaging system may be implemented to handle the transfer of messages among clients of a computer network having a client-server configuration. The messaging system typically has one or more message oriented middleware servers ("MOM servers") for processing messages. Each client is connected to a MOM server of the messaging system.

Many messaging systems include at least two MOM servers. A group of two or more MOM servers is commonly referred to as a cluster. Advantages of processing messages via a cluster instead of via a single MOM server may include improved reliability and increased capacity. For example, if one MOM server in a cluster fails, the remaining one or more MOM servers may still be able to handle all of the cluster's message transferring requirements. As another example, a messaging system having a cluster may have a greater message processing capability than a messaging system having only a single MOM server.

MOM servers in a cluster cooperate in the transferring of messages between clients. It is not necessary for clients to be connected to the same MOM server in order for them to transfer messages among themselves. For example, consider a cluster having two MOM servers and two clients. One client is connected to one MOM server, and the other client is connected to the other MOM server. Because both clients are connected to the same cluster, they can exchange messages with each other even though they are connected to different MOM servers.

A MOM server generally has a plurality of server processes. Server processes are MOM server elements that provide certain functions for the MOM server. For example, a MOM server may include a client interface process to handle a connection between the MOM server and a client. As another example, a MOM server may also include a message routing process to help the MOM server route messages to clients.

Server processes may have a plurality of operating states. For example, a client interface process may have a client connected operating state and a client disconnected operating state. A message routing process may have an operating state corresponding to each of a group of possible message categories.

Server processes may need to transition from one operating state to another. For example, a client interface process may need to transition from a connected operating state to a disconnected operating state if a client wishes to disconnect from the MOM server. As another example, an internal component of the MOM server may need to transition from an initializing operating state to a normal operating state during server boot-up.

A server process may transition from one operating state to another by executing a state transition command. A state transition command is an instruction which instructs a server process to transition from one operating state to another.

It is often necessary to synchronize execution of state transition commands among MOM servers in a cluster. For example, synchronization may be required to prevent two or more incompatible state transition commands from being executed simultaneously. Synchronization of the execution of state transition commands can be accomplished by implementing algorithms that guarantee that solely one state transition command can be executed at a given time. However, such algorithms are typically complex and therefore, difficult and expensive to design, implement, debug, and test. Such algorithms typically become even more complex when the quantity of active MOM servers within the cluster may vary due to MOM servers entering and leaving the cluster. Therefore, a simpler method of synchronizing execution of state transition commands among MOM servers in a cluster is needed.

SUMMARY

The method of synchronizing execution of state transition commands in a cluster of MOM servers herein disclosed advances the art and overcomes at least one of the problems articulated above by providing a relaxed method of synchronizing execution of state transition commands.

In particular, and by way of example only, according to one embodiment, a method of synchronizing execution of state transition commands in a cluster of MOM servers includes providing a lock transferable among the servers and a lock manager on each server. A server receiving a state transition command executes a state transition command handling process. A server receiving a request lock command from another server executes a received lock request process. A server receiving an engage lock command from another server executes an engage lock request process.

According to another embodiment, a method of transferring a lock for synchronizing execution of state transition commands in a cluster of MOM servers includes sending a request lock command by a first server to all servers in the cluster in response to the first server receiving a state transition command. A second server currently possessing the lock sends a grant lock command to the first server. The first server executes an engage lock process.

In yet another embodiment, a method of facilitating sharing of a lock in a cluster of MOM servers includes executing a lock timer process on a first server a first time duration after the first server has engaged the lock. Each server of the cluster engages a lock guardian process on a periodic basis.

DETAILED DESCRIPTION

Before proceeding with the detailed description, it is to be appreciated that the present teaching is by way of example only, not by limitation. The concepts herein are not limited to use or application with a specific type of method of synchronizing execution of state transition commands in a cluster of MOM servers. Thus, although the instrumentalities described herein are for the convenience of explanation, shown and described with respect to exemplary embodiments, it will be appreciated that the principles herein may be applied equally in other types of methods of synchronizing execution of state transition commands in a cluster of MOM servers.

Figure 1:
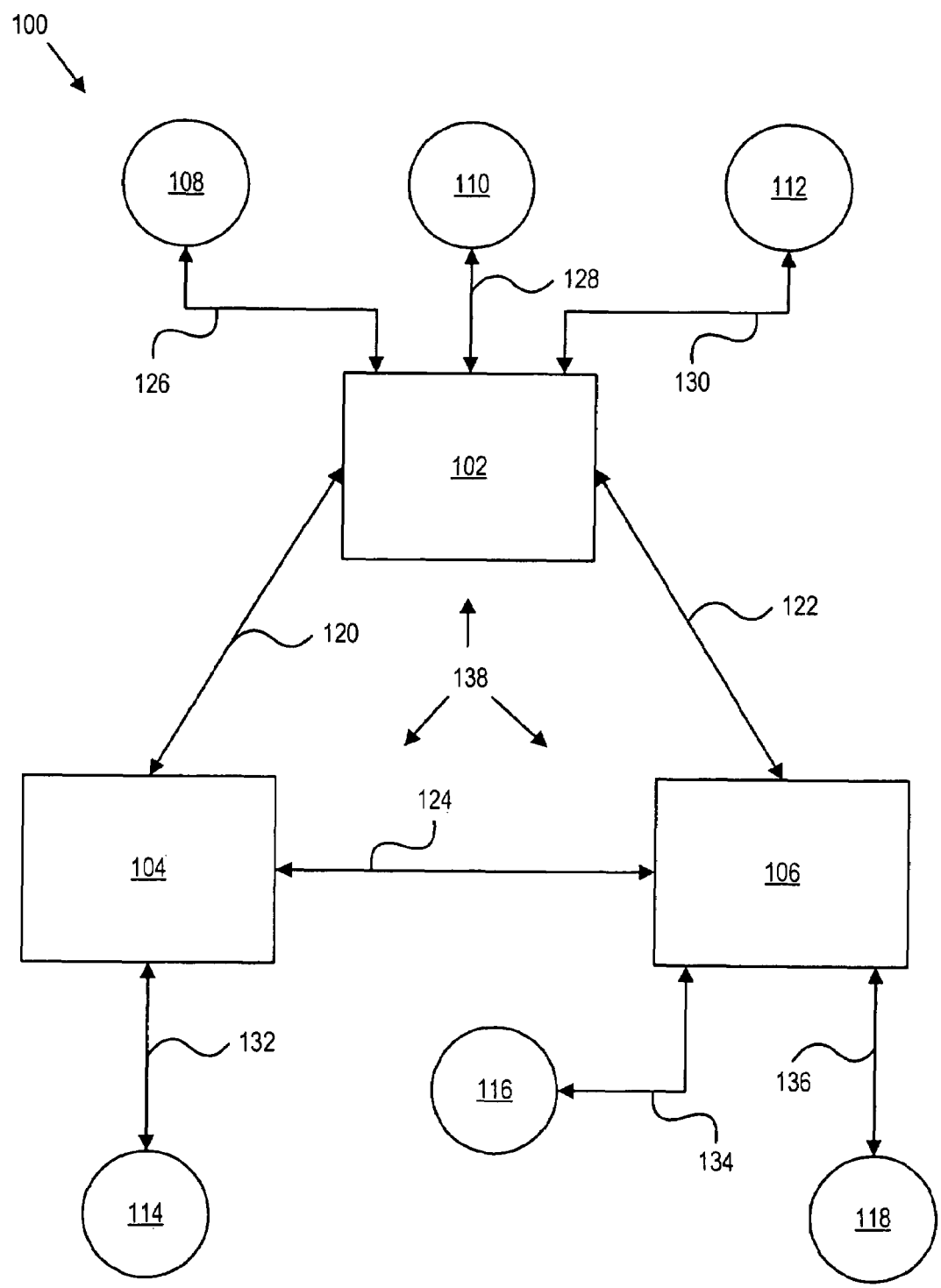
FIG. 1 is a schematic of a messaging system, according to an embodiment.

FIG. 1 is a schematic of messaging system 100. Messaging system 100 illustrates an exemplary application of an embodiment of the method of synchronizing execution of state transition commands in a cluster of MOM servers ("Synchronization Method").

Messaging system 100 includes cluster 138, which for purposes of illustration is shown having MOM servers 102, 104, and 106. It is to be understood, however, that depending on the size of cluster 138, any number of MOM servers may be employed. MOM server 102 is connected to MOM server 104 via communication link 120. MOM server 104 is connected to MOM server 106 via communication link 124. MOM server 102 is connected to MOM server 106 via communication link 122.

For purposes of illustration, messaging system 100 is shown having six clients. It is to be understood, however, that depending on the size of messaging system 100, any number of clients may be employed. Clients 108, 110, and 112 are connected to MOM server 102 via communication links 126, 128, and 130, respectively. Client 114 is connected to MOM server 104 via communication link 132. Clients 116 and 118 are connected to MOM server 106 via communication links 134 and 136, respectively.

By way of example and not of limitation, clients 108, 110, 112, 114, 116, and 118 may be Java applications and/or C++ applications. Cluster 138 may be capable of processing Java instructions, C++ instructions, or other types of instructions.

Cluster 138 handles the transfer of objects from one client to another or from one client to cluster 138. Objects include messages and state transition commands. Consequently, clients 108, 110, 112, 114, 116, and 118 do not directly transfer messages or state transition commands to each other.

For purposes of illustration of the system methodology, assume client 108 desires to send a message to client 112. Client 108 creates and maintains a connection with MOM server 102 via communication link 126. Client 112 in turn creates and maintains a connection with MOM server 102 via communication link 130. The message is transferred from client 108 to client 112 via communication link 126, MOM server 102, and communication link 130.

The quantity of active MOM servers within cluster 138 is not static. MOM servers may enter and leave cluster 138 for various reasons. As an example, a MOM server may leave cluster 138 if it fails or if it is brought down for maintenance. As another example, a MOM server may enter cluster 138 if the MOM server had previously failed but has been repaired.

The MOM servers within cluster 138 each have a plurality of server processes. Examples of server processes include a client interface process for handling a connection between a MOM server and a client. Many of the server processes may need to transition from one operating state to another by executing state transition commands. A MOM server may receive a state transition command from a client or from another MOM server. For example, a MOM server may receive a state transition command from a client instructing the MOM server to disconnect the client from the MOM server. As another example, a first MOM server may receive a state transition command from a second MOM server requesting the first MOM server change an operating state of a message routing server process on the first MOM server. Alternately, a MOM server may internally generate a state transition command. For example, a MOM server may generate a state transition command instructing an internal server process to transition from an initialization operating state to a normal operating state during server boot-up.

Execution of state transition commands by the MOM servers within cluster 138 must be synchronized. Such synchronization is required because conflicts may result if certain state transition commands are executed simultaneously. For example, such conflicts may result if two incompatible state transition commands are executed simultaneously. As another example, a conflict may result if a state transition command that may only be executed by one MOM server at a time is simultaneously executed by two MOM servers.

An example of a state transition command that may only be executed by one MOM server at a time is a state transition command that connects a client to a queue. The queue can only support one client at a time. Therefore, before a MOM server connects a client to the queue, the MOM server must check if the queue is free. If two different MOM servers check if the queue is available at about the same time, it is possible that both MOM servers may determine that the queue is available. Both MOM servers may then attempt to connect their client to the queue by executing the state transition command, resulting in a conflict. In order to prevent such conflict, only one MOM server should be able to execute the state transition command associated with connecting a client to the queue at a given time.

As was stated above, an embodiment of the Synchronization Method is used to synchronize execution of state transition commands in cluster 138. The Synchronization Method generally prevents more than one state transition command from being simultaneously executed within cluster 138 at a given time. However, in order to minimize cost, complexity, and MOM server resource requirements, the Synchronization Method does not absolutely guarantee that two or more state transition commands may not be simultaneously executed within cluster 138. Thus, the Synchronization Method may be considered to be relaxed when compared to synchronization algorithms which absolutely guarantee that solely one state transition command may be executed in a cluster at a given time. The relaxed nature of the Synchronization Method is acceptable for use in cluster 138 because it is unlikely that one or more MOM servers will attempt to simultaneously execute two or more state transition commands. The relaxed nature of the Synchronization Method may make the Synchronization Method easier to design, implement, debug, and test than other methods of synchronizing execution of state transition commands. Additionally, the relaxed nature of the Synchronization Method may result in the Synchronization Method requiring fewer MOM server resources than other methods of synchronizing execution of state transition commands.

Figure 2:
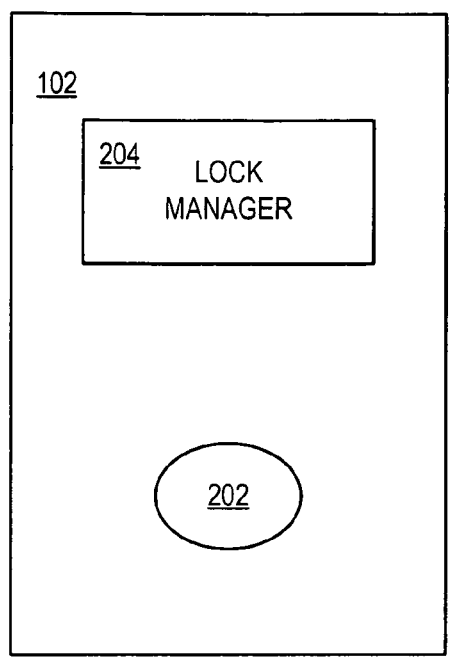
FIG. 2 is a block diagram of a MOM server, according to an embodiment.

An embodiment of the Synchronization Method includes a single lock that is circulated among the MOM servers in a cluster as well as a lock manager located on each MOM server. FIG. 2 is a block diagram of MOM server 102 of cluster 138. MOM server 102 includes lock 202 and lock manager 204. Although FIG. 2 only shows MOM server 102 for illustrative purposes, other MOM servers in cluster 138 include lock manager 204. However, the Synchronization Method generally prevents more than one instance of lock 202 from being present in cluster 138 at a given time.

Lock 202 is used to help prevent more than one state transition command from being executed in cluster 138 at a given time. Lock 202 is a virtual token which is circulated among the MOM servers in cluster 138. As was stated above, generally only one instance of lock 202 is present in cluster 138 at a given time. Furthermore, the Synchronization Method allows lock 202 to be possessed by only one MOM server at a given time. Consequently, generally only one MOM server in cluster 138 may possess lock 202 at a given time.

The Synchronization Method allows solely the MOM server possessing lock 202 to begin to execute a state transition command. Furthermore, a MOM server possessing lock 202 may only begin to execute a single state transition command at a given time. Consequently, generally only one state transition command may begin to be executed in cluster 138 at a given time.

Figure 3:
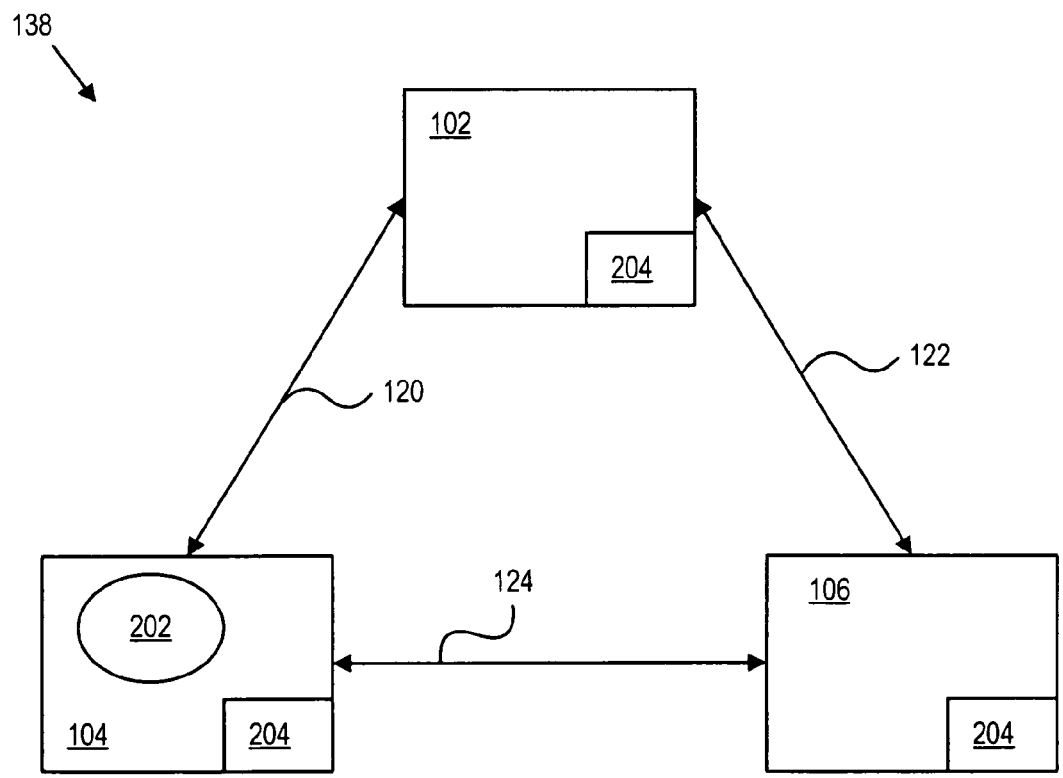
FIG. 3 is a schematic of a messaging system, according to an embodiment.

In order to allow each MOM server in cluster 138 an opportunity to execute a state transition command, lock 202 is circulated among the MOM servers in cluster 138 under the Synchronization Method. To illustrate use of lock 202 in cluster 138, FIG. 3 illustrates a simplified embodiment of cluster 138. FIG. 3 includes MOM servers 102, 104, and 106. In FIG. 3, MOM server 104 currently possesses lock 202. Thus, generally solely MOM server 104 of cluster 138 may begin to execute a state transition command.

As was stated above, in an embodiment of the Synchronization Method, each MOM server of cluster 138 includes a lock manager. For example, FIG. 3 shows MOM servers 102, 104, and 106 having lock manager 204. A lock manager is a software and/or hardware subsystem that helps implement the Synchronization Method on a MOM server. In at least one embodiment of the Synchronization Method, the lock manager is a software subsystem. The lock managers of each MOM server cooperate among themselves to coordinate the transfer of lock 202 among the MOM servers of cluster 138 in order to allow each MOM server an opportunity to execute state transition commands.

Figure 4:
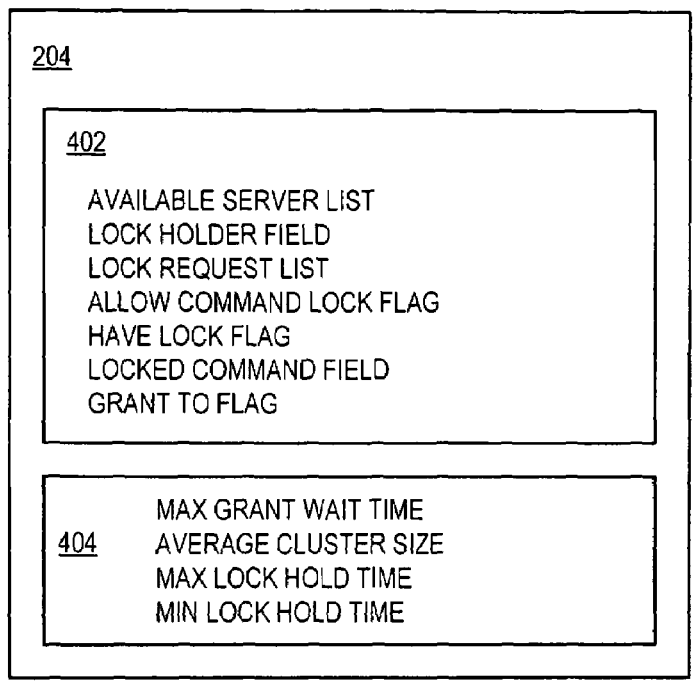
FIG. 4 is a block diagram of a lock manager, according to an embodiment.

FIG. 4 is a block diagram of lock manager 204. Lock manager 204 includes internal state list 402. Internal state list 402 helps lock manager 204 manage lock 202 by storing state information related to lock 202 and the MOM servers in cluster 138. In an embodiment of the Synchronization Method, internal state list 402 includes the following state information: (1) an available server list, (2) a lock holder field, (3) a lock request list, (4) an allow command lock flag, (5) a have lock flag, (6) a locked command field, and (7) a grant to flag. It should be noted that contents of this state information may vary among MOM servers.

The available server list houses identities of most recent known MOM servers that have participated in cluster 138. When any MOM server in cluster 138 performs a lock operation, each MOM server in cluster 138 adds the identity of the MOM server that performed the lock operation to the top of its available server list. A lock operation includes a MOM server sending a request lock command, an engage lock command, or grant lock command, each of which will be discussed in more detail below. Thus, each MOM server's available server list contains the identities of MOM servers that have performed a lock operation. However, in an embodiment of the Synchronization Method, the quantity of MOM server identities that may be present on an available server list is limited to an average cluster size, which will be discussed in more detail below. If the quantity of MOM server identities present on an available server list exceeds the average cluster size, the MOM server hosting the available server list removes the MOM server identity located at the bottom of the available server list.

The lock holder field houses the identity of the MOM server thought to currently possess lock 202. For example, in FIG. 3, MOM server 104 currently possesses lock 202. Therefore, the lock holder field in each MOM server's internal state list 402 would house the identity of MOM server 104.

The lock request list houses identities of MOM servers that have requested lock 202. In an embodiment of the Synchronization Method, when a MOM server receives a request to execute a state transition command, the MOM server requests to be granted lock 202 if the MOM server does not already possess lock 202. A MOM server requests lock 202 by sending a request lock command to all other MOM servers in cluster 138. Each time a MOM server requests lock 202 by sending a request lock command to the other MOM servers in cluster 138, each MOM server in cluster 138 adds the identity of the requesting MOM server to its lock request list in its internal state list 402.

It should be noted that the contents of each MOM server's lock request list may vary. For example, if a MOM server is busy, it may not be able to update its lock request list as quickly as other MOM servers might be able to update their lock request lists. As a second example, if multiple MOM servers send a request lock command at about the same time, the MOM servers within cluster 138 may process the request lock commands in different orders. Consequently, the order of entries of the lock request lists of the MOM servers in cluster 138 may vary. As a third example, there is no guarantee that a request lock command will be successfully delivered to each MOM server in cluster 138. Consequently, one or more MOM servers may not receive a request lock command and will not update their lock request lists to reflect the sending of the request lock command.

The allow command lock flag indicates whether a MOM server can begin to execute a state transition command. Because the Synchronization Method generally permits solely the one MOM server in cluster 138 possessing lock 202 to begin executing a state transition command, the allow command lock flag generally may be true solely on the MOM server of cluster 138 possessing lock 202.

The have lock flag indicates that the MOM server possesses lock 202. Again, because generally only one MOM server in cluster 138 may possess lock 202 at a given time, the have lock flag generally may be true on only one MOM server within cluster 138 at a given time. In FIG. 3, the have lock flag would be true only on MOM server 104.

The locked command field indicates what state transition command is currently associated with lock 202 and is being executed. In FIG. 3, the locked command field on MOM server 104 would correspond to a state transition command, if any, being executed by MOM server 104. The locked command field on the remaining MOM servers in cluster 138 would house a null value or be empty because the remaining MOM servers do not possess lock 202, and therefore, cannot execute a state transition command.

The grant to flag indicates that the MOM server has granted lock 202 to another MOM server. For example, in FIG. 3, if MOM server 104 were to grant lock 202 to another MOM server, such as MOM server 106, the grant to flag in MOM server 104 would be true. Because generally only one MOM server may possess lock 202 at a given time, generally only one MOM server may grant lock 202 to another MOM server at a given time. Consequently, the grant to flag generally may only be true on one MOM server in cluster 138 at a given time.

Lock manager 204 may also include predetermined configuration values 404. Configuration values 404 are used by certain processes in an embodiment of the Synchronization Method, as will be discussed below. Configuration values 404 may include a max grant wait time, an average cluster size, a max lock hold time, and a min lock hold time. The max grant wait time is a maximum amount of time a MOM server will wait to receive an engage lock command after granting lock 202 to another MOM server. The average cluster size is the average of the number of MOM servers expected to participate in cluster 138. The max lock hold time value is a maximum amount of time a MOM server is permitted to possess lock 202 before checking to see if another MOM server requires lock 202. The min lock hold time value is a minimum amount of time a MOM server is permitted to possess lock 202 before checking to see if another MOM server requires lock 202.

As was stated above, the Synchronization Method generally prevents more than one state transition command from be executed in cluster 138 at a given time. In an embodiment of the Synchronization Method, a MOM server receiving a request to execute a state transition command executes state transition command handling process 500. State transition command handling process 500 helps insure that the MOM server receiving a request to execute a state transition command executes the state transition command according to the Synchronization Method.

Figure 5:
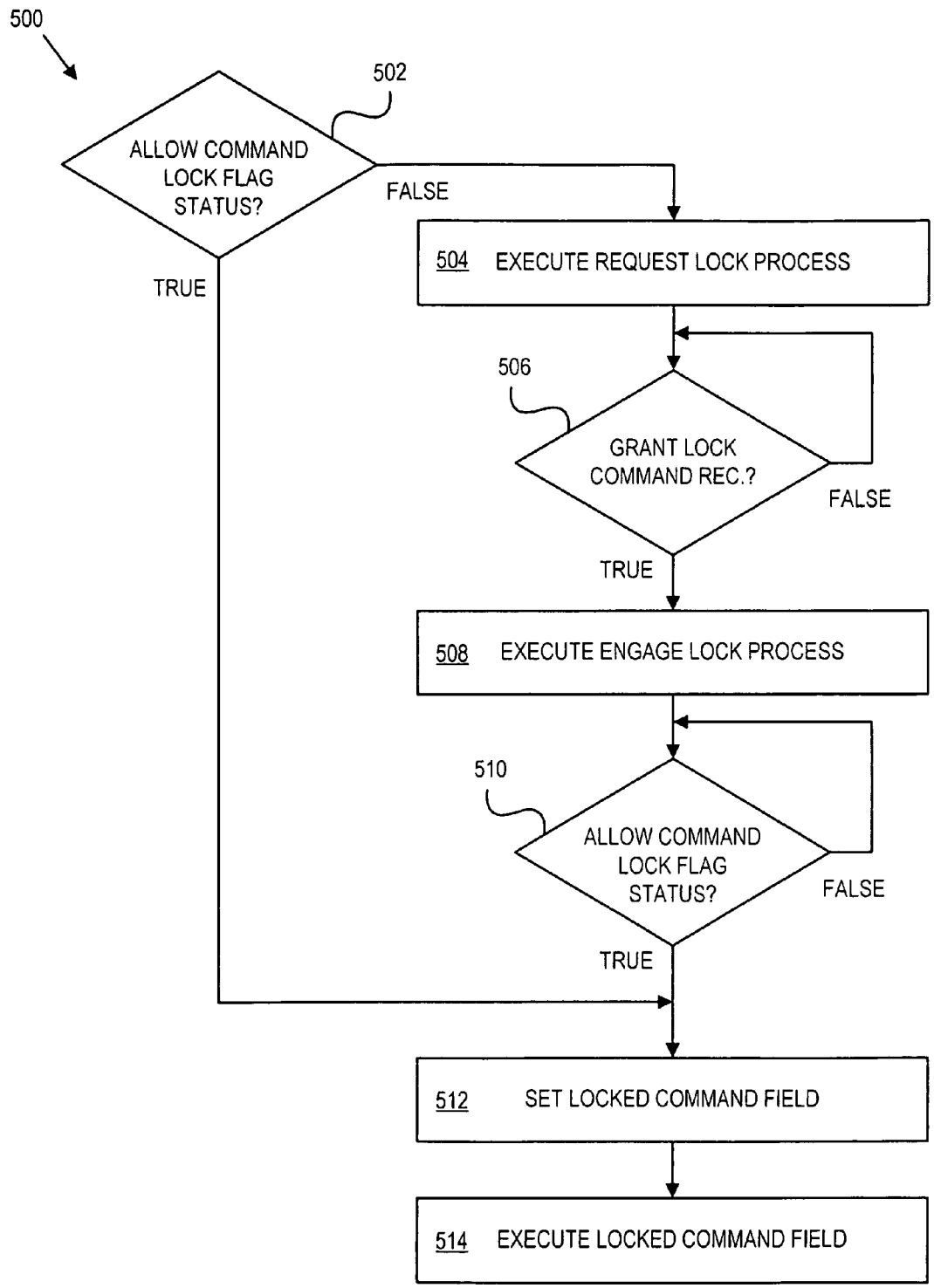
FIG. 5 is a flow chart of a state transition command handling process, according to an embodiment.

FIG. 5 is a flow chart of state transition command handling process 500. Process 500 begins at decision 502, wherein the MOM server that received the state transition command ("first MOM server") determines the status of its allow command lock flag. As was stated above, the allow command lock flag indicates whether the MOM server possesses lock 202, and consequently whether the MOM server can begin to execute a state transition command. If the result of decision 502 is false, process 500 proceeds to a first sub process including steps 504, 506, 508, and 510. Otherwise, process 500 proceeds to a second sub process including steps 512 and 514.

In step 504, the first MOM server executes a request lock process, which will be discussed in more detail with respect to FIG. 6. In decision 506, the first MOM server determines whether it has received a grant lock command from another MOM server. The grant lock command is a command issued by a MOM server indicating that the issuing server is granting lock 202 to another MOM server. If the result of decision 506 is false, process 500 remains at decision 506 until decision 506 is true. In other words, process 500 waits at decision 506 until another MOM server grants lock 202 to the first MOM server. If the result of decision 506 is true, the first MOM server executes an engage lock process in step 508. The engage lock process will be discussed in more detail with respect to FIG. 7.

In decision 510, the first MOM server again determines the status of its allow command lock flag. If the result of decision 510 is false, process 500 remains at decision 510 until decision 510 is true. If decision 510 is true, process 500 proceeds to step 512 of the second sub process.

In step 512, the first MOM server sets its locked command field to the state transition command that it received. As was stated above, the locked command field houses the state transition command that a MOM server will execute or is currently executing. Finally, in step 514, the first MOM server executes the state transition command housed in its locked command field.

A partial summary of process 500 is as follows. Process 500 permits the first MOM server to execute a state transition command only when it is in possession of lock 202. If the first MOM server does not possess lock 202, process 500 executes a request lock process so that the first MOM server can be granted lock 202. After the first MOM server is granted lock 202 by another MOM server in cluster 138, process 500 executes an engage lock process so that the first MOM server can engage lock 202.

As was noted above, in an embodiment of the Synchronization Method, when a MOM server receives a request to execute a state transition command but does not possess lock 202, the MOM server must request to be granted lock 202. In an embodiment, a MOM server wishing to be granted lock 202 ("first MOM server") may request lock 202 by executing request lock process 600.

Figure 6:
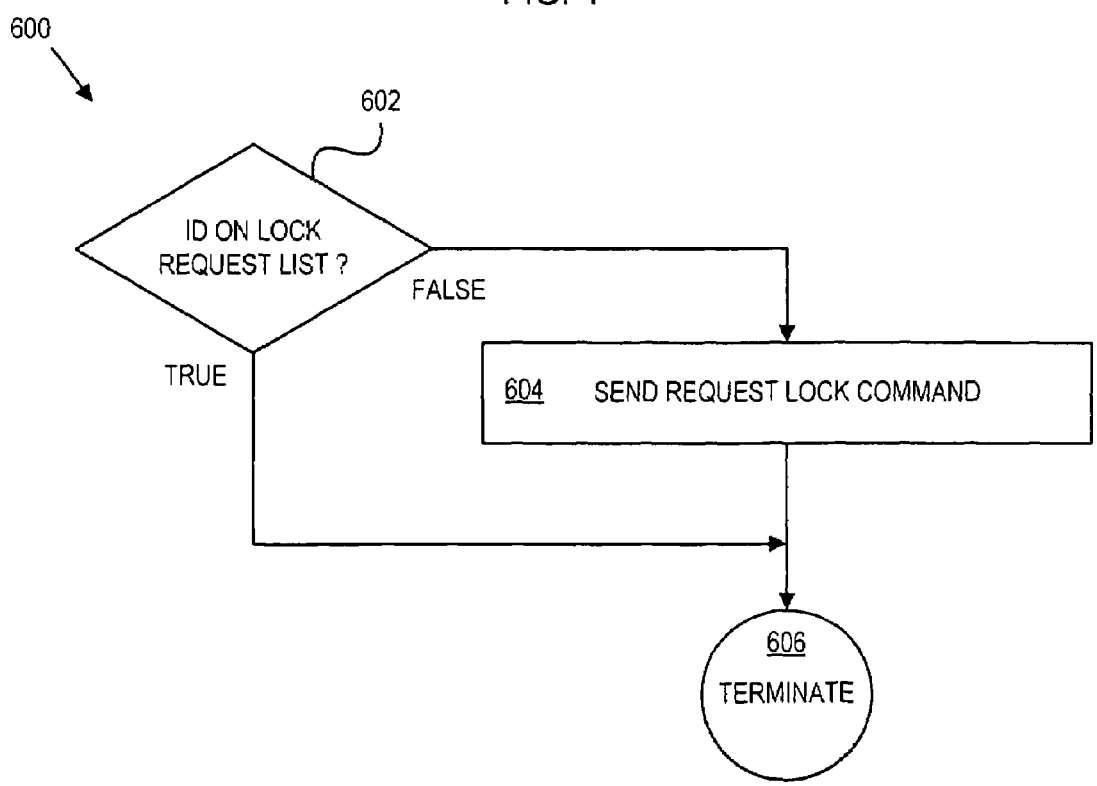
FIG. 6 is a flow chart of a request lock process, according to an embodiment.

FIG. 6 is a flow chart of request lock process 600. Process 600 begins with decision 602 wherein the first MOM server checks if an identity corresponding to itself is present in on its lock request list. As was stated above, the lock request list houses identities of MOM servers that have requested lock 202. If the result of decision 602 is true, the first MOM server has already sent a request lock command to other MOM servers in cluster 138, and request lock process 600 terminates in step 606.

If the result of decision 602 is false, the first MOM server needs to request lock 202. Consequently, process 600 proceeds to step 604 wherein the first MOM server sends a request lock command to all other MOM servers in cluster 138. Thus, the request lock command is received by MOM servers not possessing lock 202 as well as by the MOM server possessing lock 202. Lock request process 600 subsequently terminates in step 606.

Figure 7:
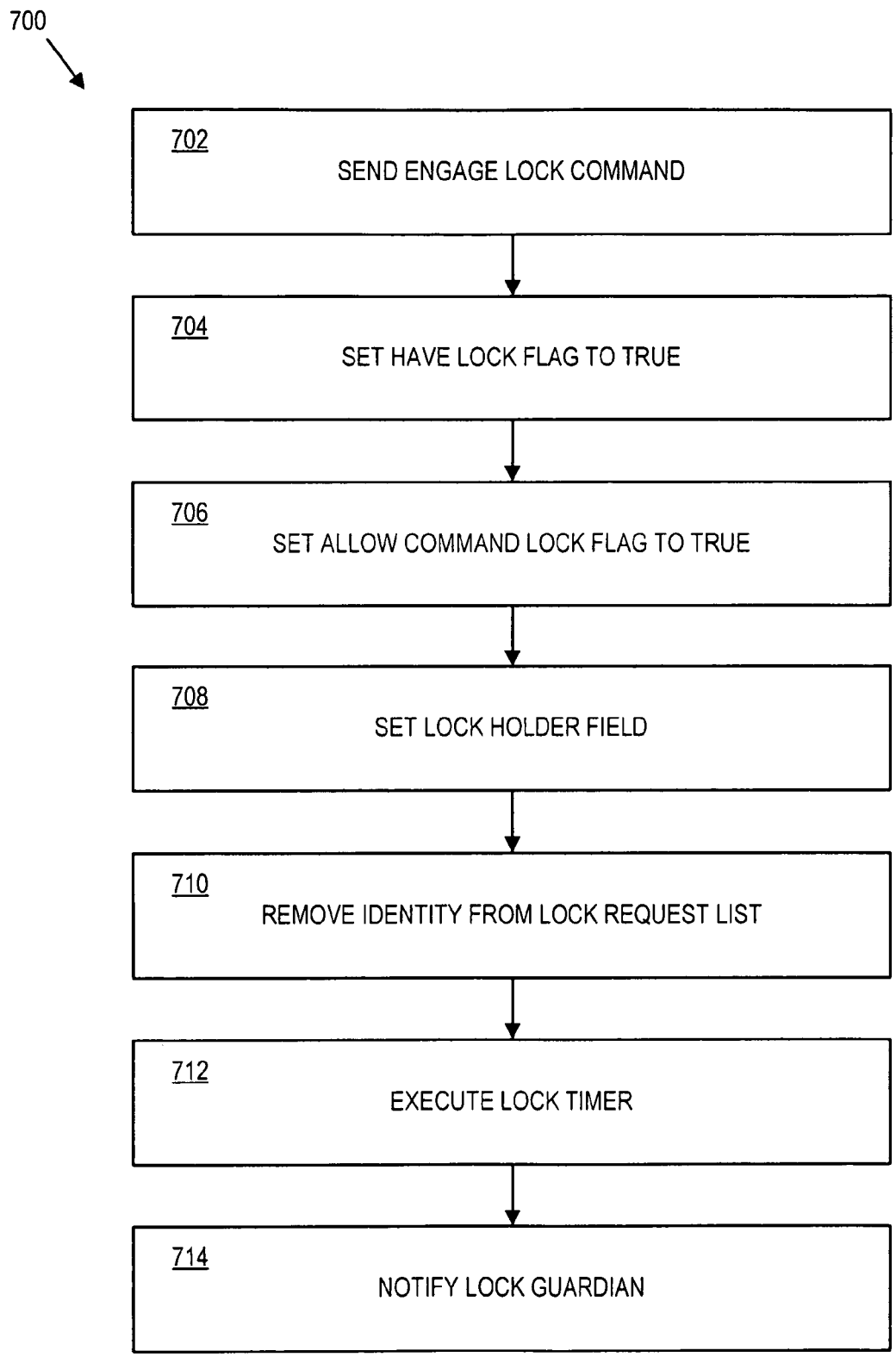
FIG. 7 is a flow chart of an engage lock process, according to an embodiment.

In an embodiment of the Synchronization Method, a MOM server that has been granted lock 202 ("first MOM server") must execute engage lock process 700 to obtain lock 202 from a MOM server granting lock 202 to the first MOM server. FIG. 7 is a flow chart of engage lock process 700. Process 700 begins at step 702 wherein the first MOM server sends an engage lock command to all other MOM servers in cluster 138. The engage lock command informs the other MOM servers that the first MOM server is engaging or obtaining possession of lock 202.

In step 704, the first MOM server sets its have lock flag to true, indicating that the first MOM server possesses lock 202. In step 706, the first MOM server sets its allow command lock flag to true, indicating that the first MOM server may begin to execute a state transition command. In step 708, the first MOM server sets its lock holder field to an identity corresponding to itself. As was stated above, the lock holder field indicates which MOM server in cluster 138 currently possesses lock 202.

In step 710, the first MOM server removes the identity corresponding to itself from its lock request list. As was noted above, the lock request list houses identities of MOM servers that have requested lock 202. Because the first MOM server has been granted lock 202, its identity no longer belongs on lock request lists.

In step 712, the first MOM server executes a lock timer process after an expiration of a first time duration. The lock timer process will be discussed in more detail with respect to FIG. 8. In an embodiment, the first time duration may be determined as follows. The first MOM server determines the quantity of MOM server identities present on its lock request list. If the quantity of identities is less than or equal to one, at most one other MOM server is waiting to be granted lock 202. In this situation, the first time duration is set to the max lock hold time specified in configuration values 404.

If the quantity of MOM server identities is greater than the average cluster size, a relatively large number of MOM servers are waiting to possess lock 202. In this situation, the first time duration is set to the min lock hold time specified in configuration values 404.

If the quantity of MOM server identities is greater than one but less than the average cluster size, the first time duration is determined as follows. The min lock hold time value is subtracted from the max lock hold time value. The resulting difference is divided by the average cluster size. The resulting quotient is multiplied by the current number of server identities present on the lock request list. The first time duration is set equal to the resulting product.

Finally, engage lock process 700 concludes with step 714 wherein a lock guardian process of the first MOM server is notified that the engage lock process has been executed. The lock guardian process will be discussed in more detail with respect to FIG. 10.

In an embodiment of the Synchronization Method, a MOM server executes lock timer process 800 after engaging lock 202. Lock timer process 800 limits an amount of time a MOM server may possess lock 202, thereby allowing other MOM server in cluster 138 an opportunity to possess lock 202.

Figure 8:
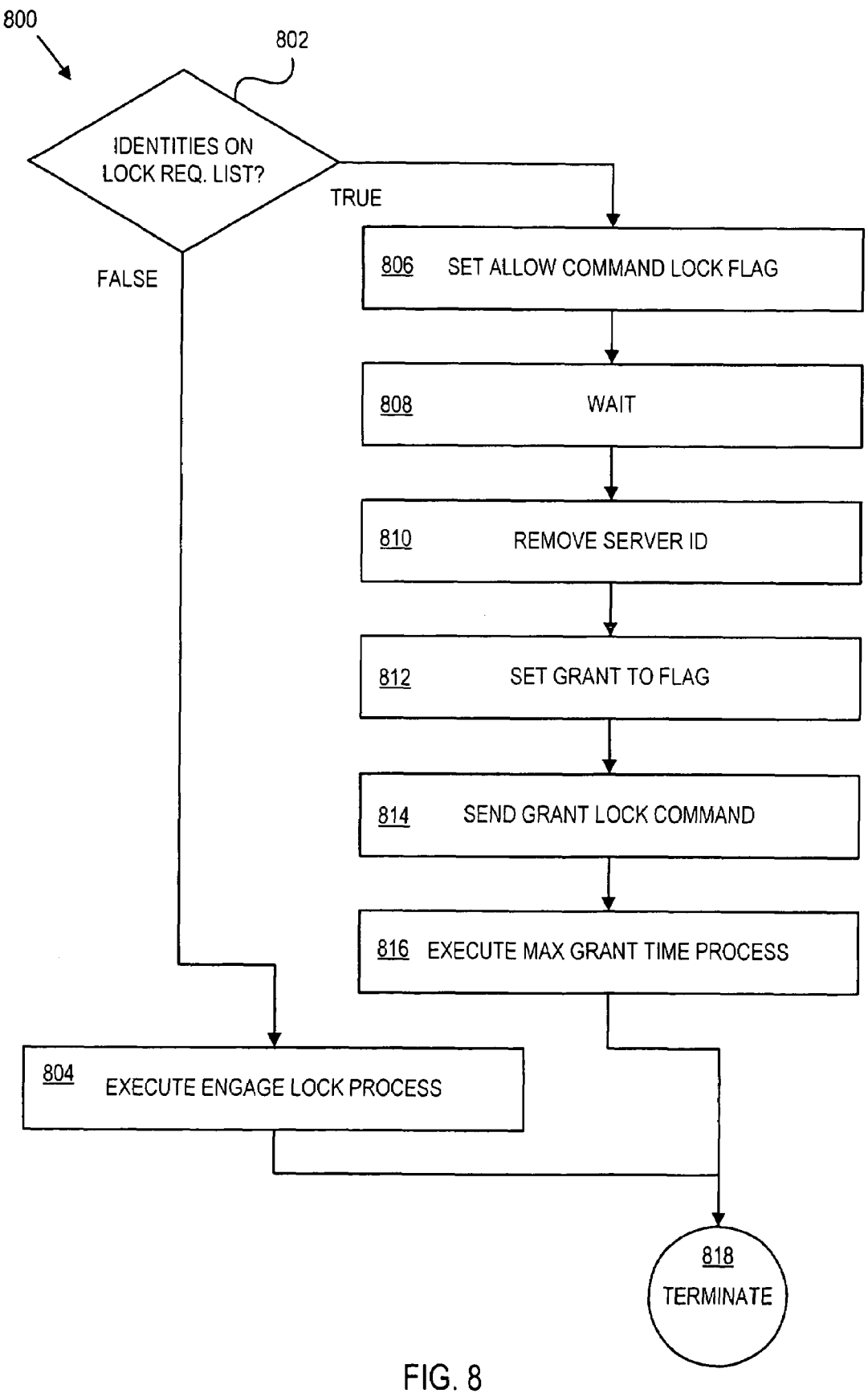
FIG. 8 is a flow chart of a lock timer process, according to an embodiment.

FIG. 8 is a flow chart of lock timer process 800. In order to illustrate operation of process 800, assume that a first MOM server has engaged lock 202 and is beginning to execute lock timer process 800 after an expiration of a first time duration as discussed with respect to FIG. 7. Process 800 begins with decision 802 wherein the first MOM server determines if there are server identities present on its lock request list. As was stated above, the lock request list houses identities of MOM servers that have requested to be granted lock 202. If the result of decision 802 is false, there are no other MOM servers in cluster 138 waiting to be granted lock 202. Consequently, the first MOM server may continue to possess lock 202, and the first MOM server executes engage lock process 700 in step 804. Lock timer process 800 subsequently terminates in step 818.

If the result of decision 802 is true, one or more other MOM servers in cluster 138 are waiting to be granted lock 202. Consequently, the first MOM server arranges to transfer lock 202 to another MOM server by executing a lock timer sub process. The lock timer sub process includes steps 806, 808, 810, 812, 814, and 816.

In step 806, the first MOM server sets its allow command lock flag to false. This prevents the first MOM server from beginning to execute an additional state transition command.

The first message server waits until its locked command field is empty or null in step 808. The purpose of this step is to allow the first MOM server to complete execution of any state transition command that it is currently executing. As was noted above, the locked command field indicates what state transition command a MOM server is currently executing. Consequently, when the locked command field is empty or null, the first MOM server is not executing a state transition command.

In step 810, the first MOM server identifies a MOM server identity that has been present on its lock request list for the longest amount of time. This identity corresponds to the MOM server to which the first MOM server will grant lock 202. For the purpose of explaining operation of process 800, the MOM server being granted lock 202 will be referred to as the second MOM server. The first MOM server then removes the identity corresponding to the second MOM server from its lock request list. Because the second MOM server will be granted lock 202, the second MOM server no longer needs to be represented on lock request lists.

The first MOM server sets its grant to flag to true in step 812, indicating that the first MOM server has granted lock 202 to another MOM server. In step 814, the first MOM server sends a grant lock command to all other MOM servers in cluster 138. The grant lock command indicates that the first MOM server is granting lock 202 to the second MOM server.

A max grant time process is executed in step 816. The max grant time process will be discussed in further detail with respect to FIG. 9. Lock timer process 800 subsequently terminates in step 818.

In an embodiment of the Synchronization Method, a MOM server granting a lock to another MOM server executes max grant time process 900 after granting lock 202 to the other MOM server to help prevent lock 202 from becoming lost. Lock 202 may become lost if a MOM server grants lock 202 to another MOM server ("receiving MOM server") and the receiving MOM server fails to engage lock 202. Examples of when a receiving MOM server may fail to engage lock 202 include the receiving MOM server not receiving the grant lock command and the receiving MOM server failing before being able to engage lock 202.

Figure 9:
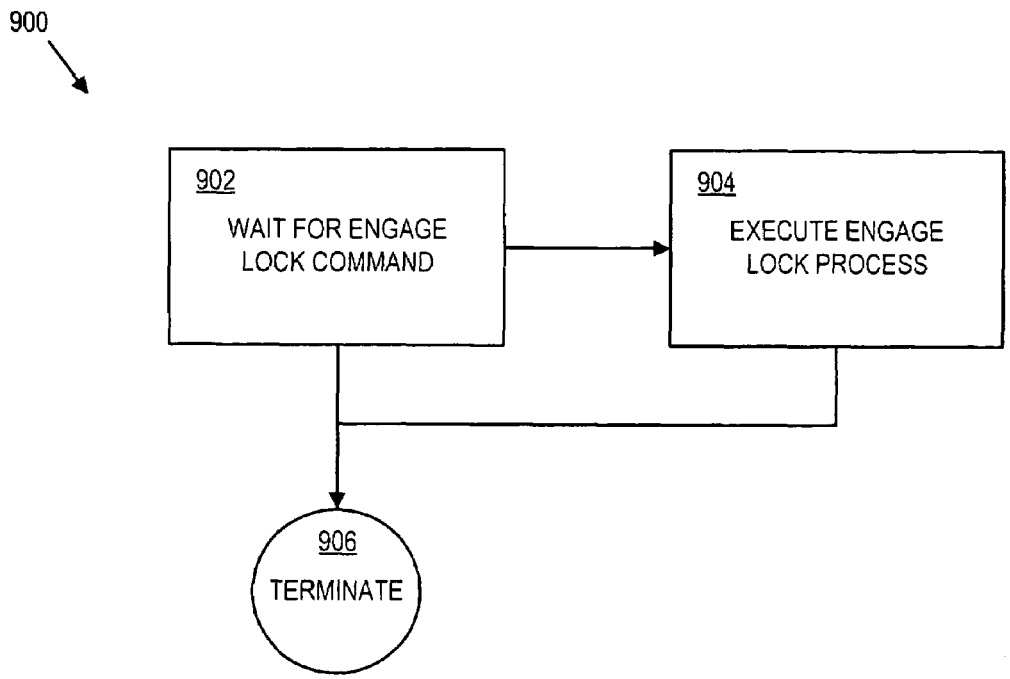
FIG. 9 is flow chart of a max grant time process, according to an embodiment.

FIG. 9 is flow chart of max grant time process 900. For the purpose of explaining FIG. 9, assume that a first MOM server has granted lock 202 to a receiving MOM server, and the first MOM server is beginning to execute max grant time process 900. Max grant time process 900 begins with step 902 wherein the first MOM server waits to receive an engage lock command from the receiving MOM server. If the first MOM server receives an engage lock command, lock 202 is not lost, and max grant time process 900 terminates at step 906.

However, if the first MOM server does not receive an engage lock command within a time period equal to the max grant wait time, max grant time process 902 assumes lock 202 has been lost and proceeds to step 904. In step 904, the first MOM server executes engage lock process 700 to re-engage lock 202 to prevent lock 202 from becoming lost. Max grant time process 900 then terminates in step 906.

In an embodiment of the Synchronization Method, each MOM server of cluster 138 may independently execute lock guardian process 1000. Lock guardian process 1000 helps prevent lock 202 from becoming lost. An example of when lock 202 might become lost is when a MOM server possessing lock 202 fails. Because the MOM server has failed, it is unable to grant lock 202 to another MOM server. Consequently, lock 202 would become lost absent lock guardian process 1000.

Figure 10:
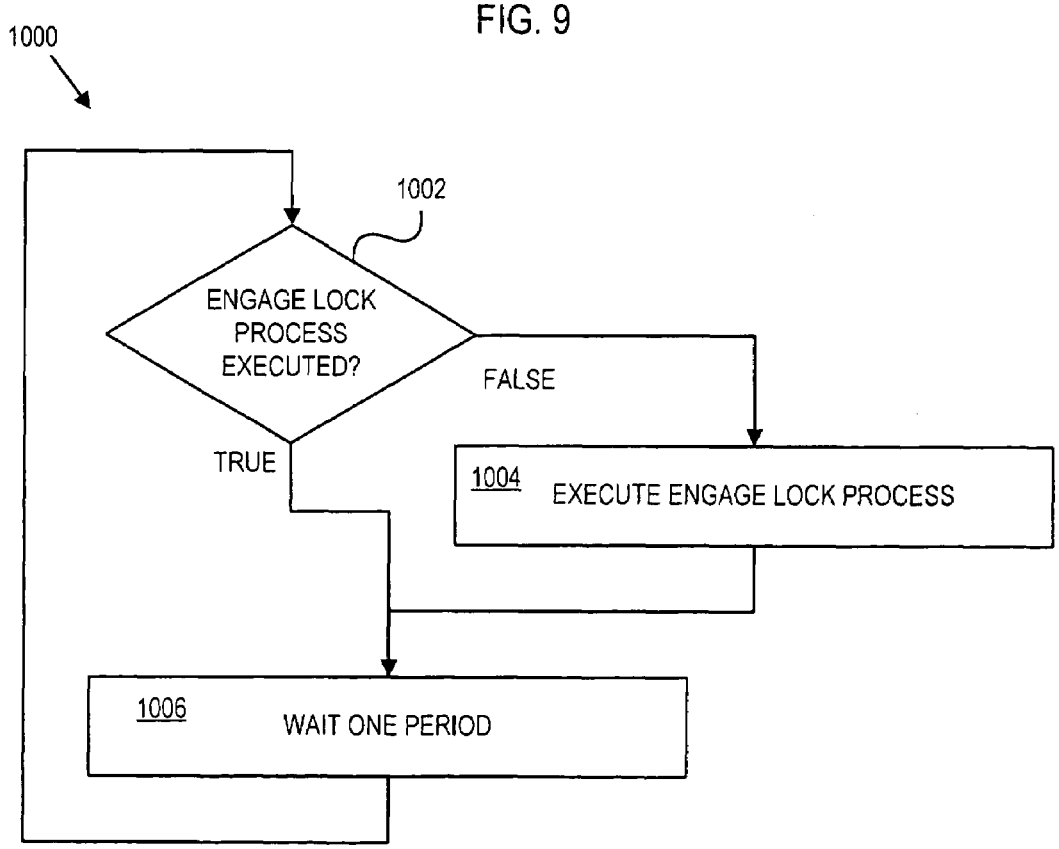
FIG. 10 is a flow chart of a lock guardian process, according to an embodiment.

FIG. 10 is a flow chart of lock guardian process 1000. In an embodiment of the Synchronization Method, each MOM server in cluster 138 independently executes process 1000 on a periodic basis. The frequency of process 1000 may vary among MOM servers in cluster 138. In an embodiment, each MOM server in cluster 138 determines the frequency of execution of its instance of lock guardian process 1000 from a random time interval generated during initialization of the MOM server's lock manager.

Lock guardian process 1000 operates in an continuous loop. Assume that a first MOM server is executing lock guardian process 1000 and that process 1000 reaches decision 1002. In decision 1002, the first MOM server determines if it has sent or received an engage lock command since the previous time its process 1000 instance reached decision 1002. If the result of decision 1002 is true, lock 202 is assumed to not be lost, and process 1000 proceeds to step 1006. In step 1006, process 1000 waits a period of time corresponding to the frequency of execution of its instance of process 1000. Process 1000 proceeds from step 1006 to step 1002.

If the result of decision 1002 is false, lock 202 may be lost. Process 1000 proceeds from decision 1002 to step 1004. In step 1004, process 1000 executes engage lock process 700 to obtain possession of lock 202 in order to prevent lock 202 from becoming lost. Process 1000 subsequently proceeds from step 1004 to step 1006.

In an embodiment of the Synchronization Method, each MOM server executes initialization process 1100 during boot-up. Initialization process 1100 initializes the lock manager of the MOM server executing initialization process 1100.

Figure 11:
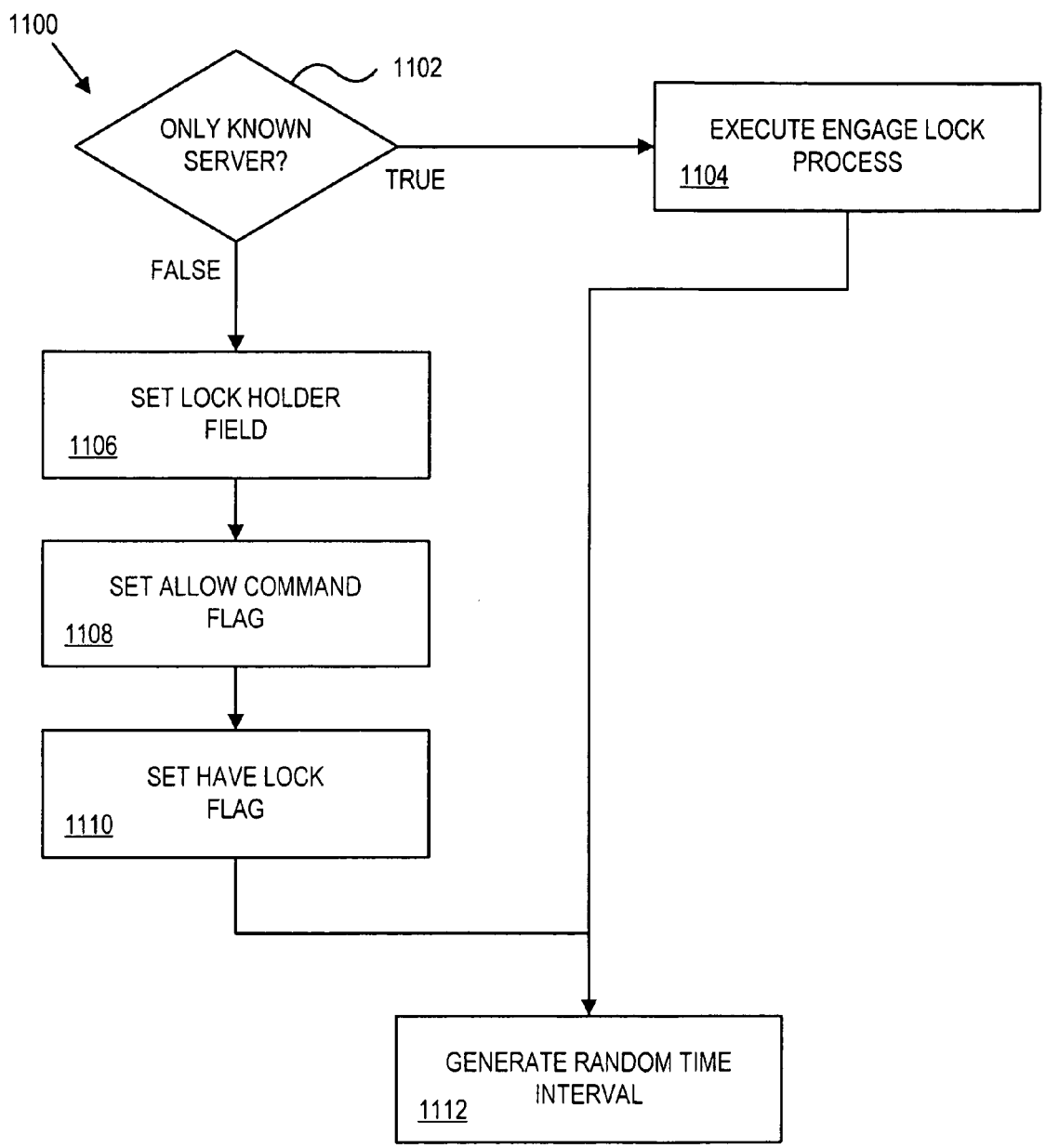
FIG. 11 is a flow chart of a process of initializing a lock manager, according to an embodiment.

FIG. 11 is a flow chart of initialization process 1100. For the purpose of explaining FIG. 11, assume that a first MOM server is booting up and is beginning to execute process 1100. Process 1100 begins with decision 1102 wherein the lock manager of the first MOM server checks if the first MOM server is an only known MOM server in cluster 138. If the result of decision 1102 is true, the first MOM server may engage lock 202, and process 1100 proceeds to step 1104. In step 1104, the first MOM server executes the engage lock process in order to engage lock 202.

If the result of decision 1102 is false, process 1100 proceeds to an initialization sub process including steps 1106, 1108, and 1110. In step 1106, the first MOM server sets its lock holder field to a value corresponding to unknown. As was stated above, the lock holder field houses an identity of the MOM server currently possessing lock 202. Until the first MOM server is fully initialized and receives lock commands from other MOM servers, the first MOM server will not know which MOM server possesses the lock (unless it is the only known MOM server in cluster 138).

In step 1108, the first MOM server sets its allow command flag to false. In step 1110, the first message server sets its have lock flag to false. Process 1100 includes steps 1108 and 1110 because the first MOM server does not possess lock 202.

Steps 1104 and 1110 proceed to step 1112. In step 1112, a random time interval is generated. The random time interval may be used to determine the period of the lock guardian process as was discussed above with respect to FIG. 10.

As was stated above, in an embodiment of the Synchronization Method, a MOM server that wishes to be granted lock 202 ("first MOM server") sends a request lock command to every MOM server in cluster 138. In an embodiment of the Synchronization Method, a MOM server receiving a request lock command ("second MOM server") may execute received lock request process 1200 to process the request lock command it received from the first MOM server.

Figure 12:
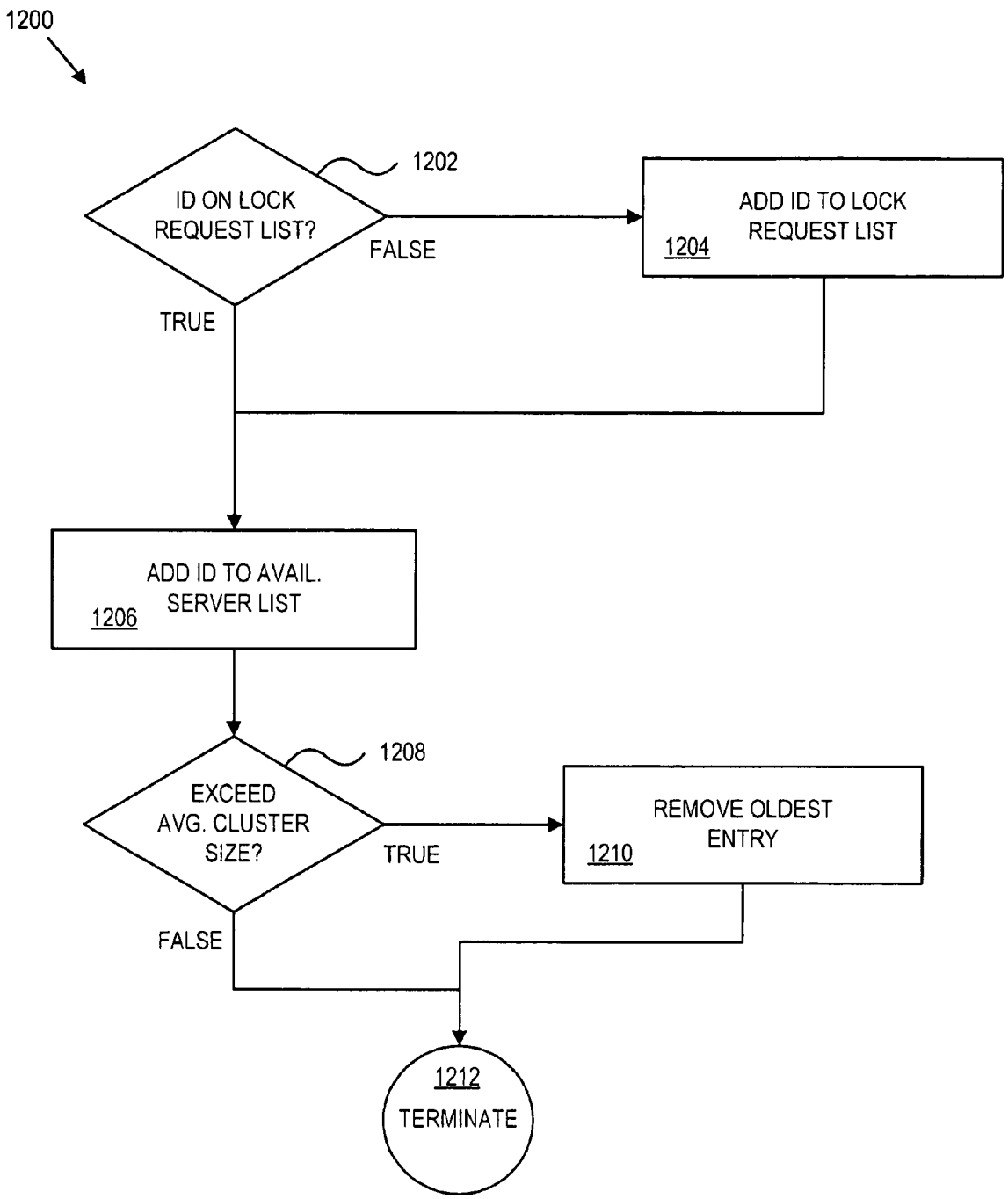
FIG. 12 is a flow chart of a received lock request process, according to an embodiment.

FIG. 12 is a flow chart of received lock request process 1200. Received lock request process 1200 begins with decision 1202 wherein the second MOM server determines if the identity corresponding to the first MOM server is present on the second MOM server's lock request list. As was stated above, the lock request list houses identities of MOM servers that have requested lock 202. If the result of decision 1202 is true, the first MOM server has already requested lock 202, and process 1200 proceeds to step 1206. If the result of decision 1202 is false, the first MOM server has not already requested lock 202, and process 1200 proceeds to step 1204. In step 1204, the identity corresponding to the first MOM server is added to the second MOM server's lock request list. Process 1200 then proceeds from step 1204 to 1206.

In step 1206, the second MOM server adds the identity corresponding to the first MOM server to the second MOM server's available server list. As was stated above, the available server list houses identities of most recent known MOM servers that have participated in cluster 138. Because the first MOM server has performed a lock operation by sending a request lock command, the first MOM server is considered a MOM server that has participated in cluster 138.

In decision 1208, the second MOM server checks whether the quantity of identities present on its available server list exceeds the average cluster size. If the result of decision 1208 is false, process 1200 terminates in step 1212. Otherwise, process 1200 proceeds to step 1210. In step 1210, the second MOM server removes the oldest entry from its available server list. Process 1200 then terminates in step 1212.

As was state above, in an embodiment of the Synchronization Methods, a MOM server that has been granted lock 202 ("first MOM server") sends an engage lock command to every other MOM server in cluster 138 stating that the first MOM server is engaging lock 202. In an embodiment of the Synchronization Method, a MOM server receiving an engage lock command ("second MOM server") executes engage lock request process 1300 to process the engage lock command.

Figure 13:
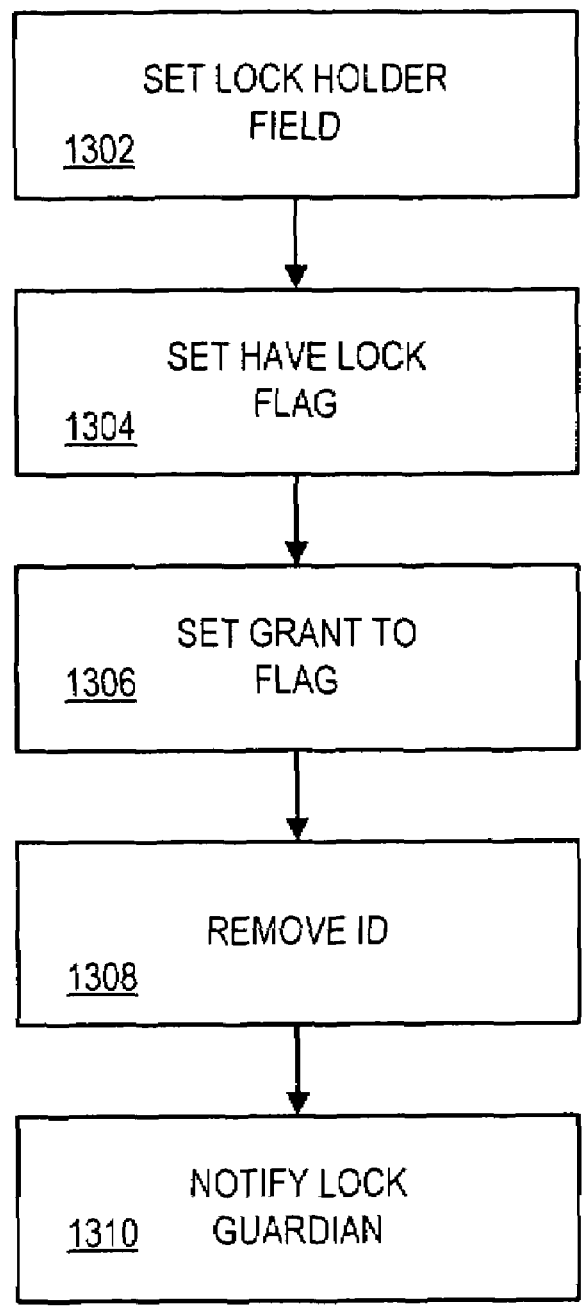
FIG. 13 is a flow chart of an engage lock request process, according to an embodiment.

FIG. 13 is a flow chart of engage lock request process 1300. Process 1300 begins with step 1302 wherein the second MOM server sets its lock holder field to an identity corresponding to the first MOM server. As was stated above, the lock holder field houses an identity corresponding to the MOM server currently thought to possess lock 202.

In step 1304, the second MOM server sets its have lock flag to false if such flag was not already set to false, indicating that the second MOM server does not possess lock 202. In step 1306, the second MOM server sets its grant to flag to false if such flag was not already set to false, indicating that the second MOM server is not granting lock 202 to another MOM server.

In step 1308, the second MOM server removes an identity corresponding to the first MOM server from its lock request list. As was stated above, the lock request list includes identities of MOM servers that have requested lock 202. Because the first MOM server has been granted lock 202, its identity no longer belongs on the lock request list. Finally, in step 1310, the second MOM server notifies its lock guardian process that the engage lock process has been executed.

Figure 14:
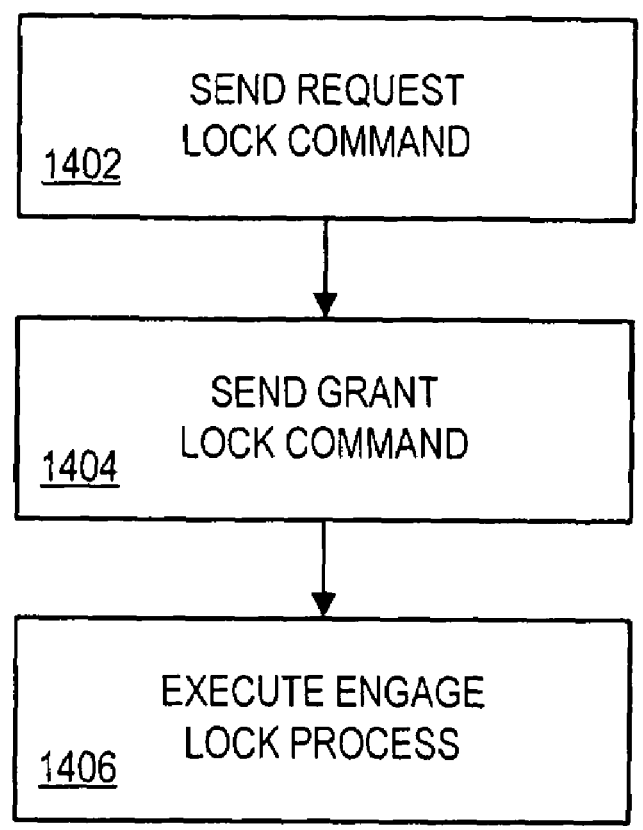
FIG. 14 is a flow chart of a method of transferring a lock for synchronizing execution of state transition commands in a cluster of MOM servers, according to an embodiment.

FIG. 14 is a flow chart of method 1400 of transferring lock 202 for synchronizing execution of state transition commands in a cluster of MOM servers. Method 1400 summarizes some of the processes of the Synchronization Method. For the purpose of explaining method 1400, assume that a first MOM server has received a state transition command and a second MOM server currently possesses lock 202.

Method 1400 begins at step 1402 wherein the first MOM server sends a request lock command to all other MOM servers in cluster 138. In step 1404, the second MOM server sends a grant lock command to all other MOM servers in cluster 138 indicating that the second MOM server is granting lock 202 to the first MOM server. Finally, in step 1406, the first MOM server engages lock 202 by executing the engage lock process.

As was discussed above, the Synchronization Method generally prevents more than one state transition command from being executed at a given time. However, due to the relaxed nature of the Sychronization Method, there are scenarios where more than one MOM server in cluster 138 could possess lock 202 at a given time. Consequently, there are scenarios where more than one state transition command could be executed at a given time.

An example of a situation where more than one MOM server in cluster 138 might possess lock 202 at a given time is as follows. MOM server 1 possesses lock 202 and has sent an engage lock command to all MOM servers in cluster 138. However, due to latency in the communication links of cluster 138, MOM server 2 does not receive an engage lock command during the period of its lock guardian process. Consequently, MOM server 2 will assume that lock 202 has been lost, and MOM server 2 will execute the engage lock process. Consequently, both MOM server 1 and MOM server 2 will possess lock 202 until engage lock commands propagate through cluster 138 and are processed by MOM server 1 and by MOM server 2.

Changes may be made in the above methods, systems and structures without departing from the scope thereof. It should thus be noted that the matter contained in the above description and/or shown in the accompanying drawings should be interpeted as illustrative and not in a limiting sense. The following claims are intended to cover all generic and specific features described herein, as well as all statements of the scope of the present method, system and structure, which as a matter of language, might be said to fall therebetween.

What is claimed is:

1. A method of synchronizing execution of state transition commands in a cluster of message oriented middleware servers, comprising the steps of:
    providing a lock transferable among the servers;
    providing a lock manager on each server, wherein each lock
        manager further comprises:
        an available server list;
        a lock holder field;
        a lock request list;
        an allow command lock flag;
        a have lock flag;
        a locked command field; and
        a grant to flag;
    executing a state transition command handling process by a server receiving a state transition command;
    executing a received lock request process by a server receiving a request lock command from another server; and
    executing an engage lock request process by a server receiving an engage lock command from another server.

2. The method of claim 1, wherein the state transition command handling process further comprises:
    determining if an allow command lock flag of the server receiving the state transition command ("first server") is true or false;
    executing a first sub process by the first server if the allow command lock flag is false, the first sub process including:
        executing a request lock process by the first server;
        waiting until the first server receives a grant lock command from a server possessing the lock;
        executing an engage lock process by the first server;
        waiting until the allow command lock flag is true;
    executing a second sub process by the first server if the allow command lock flag is true, the second sub process including:
        setting a locked command field on the first server to the state transition command; and
        executing the locked command field by the first server.

3. The method of claim 2, wherein the request lock process further comprises the first server sending the request lock command to all other servers in the cluster if an identity corresponding to the first server is not present on a lock request list of the first server.

4. The method of claim 2, wherein the engage lock process further comprises:
    sending the engage lock command by the first server to all other servers in the cluster;
    setting a have lock flag of the first server to true;
    setting the allow command lock flag of the first server to true;
    setting a lock holder field of the first server to an identity corresponding to the first server;
    removing the identity corresponding to the first server from a lock request list of the first server;
    executing a lock timer process by the first server after an expiration of a first time duration; and
    notifying a lock guardian process that the engage lock process has been executed.

5. The method of claim 4, wherein the first time duration is a function of a quantity of message server identities present on the lock request list of the first server.

6. The method of claim 4, wherein the lock timer process further comprises:
    determining if one or more identities corresponding to servers are present on the lock request list of the first server;
    executing the engage lock process by the first server if no identities corresponding to servers are present on the lock request list of the first server;
    executing a lock timer sub process by the first server if identities corresponding to servers are present on the lock request list of the first server, the lock timer sub process including:
        setting the allow command lock flag of the first server to false;
        waiting until the locked command field is empty or null;
        removing from the lock request list of the first server an identification corresponding to a server present on the lock request list of the first server for a longest amount of time;
        setting a grant to flag of the first server to true;
        sending the grant lock command from the first server to all other servers in the cluster; and
        executing a max grant time process.

7. The method of claim 6, wherein the max grant time process further comprises:
    terminating the max grant time process if the first server receives the engage lock command from a server in the cluster; and
    executing the engage lock process if the first server does not receive the engage lock command within a time duration equal to a max grant wait time.

8. The method of claim 1, wherein the received lock request process further comprises:

determining if an identity corresponding to the server sending the request lock command ("first server") is present on a lock request list of the server receiving the request lock command ("second server");

adding the identity corresponding to the first server to the lock request list of the second server if the identity corresponding to the first server is not present on the lock request list of the second server;

adding the identity corresponding to the first server to an available server list of the second server; and removing an oldest entry from the available server list of the second server if a quantity of identities present on the available server list of the second server exceeds an average cluster size.

9. The method of claim 1 wherein the engage lock request process further comprises:

setting a lock holder field of the server receiving the engage lock command ("second server") to an identity corresponding to the server sending the engage lock command ("first server");

setting a have lock flag of the second server to false if the have lock flag of the second server is set to true;

setting a grant to flag of the second server to false if the grant to flag of the second server is set to true;

removing the identity corresponding to the first server from a lock request list of the second server; and notifying a lock guardian process of the second server that an engage lock process has been executed.

10. The method of claim 1 further comprising executing a lock guardian process on each server in the cluster on a periodic basis.

11. The method of claim 10, wherein the periodic basis of each lock guardian process is determined during an initialization of a server hosting the lock guardian process.

12. The method of claim 10, wherein the lock guardian process further comprises executing an engage lock process by a server hosting the lock guardian process if the server hosting the lock guardian process has not received an engage lock command since a previous execution of the lock guardian process.

13. The method of claim 1 further comprising a process for initializing the lock manager, comprising:

determining if a server hosting the lock manager ("host server") is an only known server within the cluster;

executing an engage lock process on the host server if the host server is the only known server within the cluster;

executing a initialization sub process if the host server is not the only known server within the cluster, the initialization sub process including:

setting a lock holder field of the host server to a value corresponding to unknown;

setting an allow command lock flag to false;

setting a have lock flag to false; and determining a random time interval to be used by a lock guardian process.

14. A method of transferring a lock for synchronizing execution of state transition commands in a cluster of message oriented middleware servers, comprising the steps of:

sending a request lock command by a first server to all servers in the cluster in response to the first server receiving a state transition command;

sending a grant lock command by a second server currently possessing the lock to the first server;

executing an engage lock process by the first server; and the second server executing a received lock request process in response to the second server receiving the request lock command from the first server, the received lock request process including:

adding an identity corresponding to the first server to a lock request list of the second server if the lock request list of the second server does not contain the identity corresponding to the first server;

adding the identity corresponding to the first server to an available server list of the second server; and removing an oldest entry from the available server list of the second server if a quantity of identities presented on the available server list of the second server exceeds an average cluster size.

15. The method of claim 14, wherein the engage lock process further comprises:

sending an engage lock command by the first server to all other servers in the cluster;

setting a have lock flag of the first server to true;

setting an allow command lock flag of the first server to true;

setting a lock holder field of the first server to an identity corresponding to the first server;

removing the identity corresponding to the first server from a lock request list of the first server;

executing a lock timer process on the first server after an expiration of a first time duration; and notifying a lock guardian process of the first server that the engage lock process has been executed.

16. A method of facilitating sharing of a lock in a cluster of message oriented middleware servers, comprising the steps of:

executing a lock timer process on a first server a first time duration after the first server has engaged the lock, wherein the lock timer process further comprises:

executing an engage lock process by the first server if a lock request list of the first server contains no entries;

executing a lock timer sub process by the first server if the lock request list of the first server contains identities corresponding to servers of the cluster, the lock timer sub process including:

setting an allow command lock flag of the first server to false;

waiting until a locked command field is empty or null;

removing from the lock request list of the first server an identification corresponding to a server present on the lock request list of the first server for a longest amount of time;

setting a grant to flag of the first server to true;

sending a grant lock command from the first server to all other servers in the cluster; and executing a max grant time process; and engaging a lock guardian process on each server of the cluster on a periodic basis.

17. The method of claim 16, wherein the lock guardian process further comprises executing an engage lock process by a server hosting the lock guardian process if the server hosting the lock guardian process has not received an engage lock command since a previous execution of the lock guardian process.

* * * * *